United States Patent [19]

Hamer et al.

[11] 4,065,612

[45] Dec. 27, 1977

[54] PHENOL MODIFIED POLYMERIZATION CATALYST AND POLYMERIZATION PROCESS

[75] Inventors: Anthony David Hamer, Plainsboro; Frederick John Karol, Bellemead, both of N.J.

[73] Assignee: Union Carbide Corporation, New York, N.Y.

[21] Appl. No.: 671,975

[22] Filed: Mar. 30, 1976

[51] Int. Cl.² ............................ C08F 4/02; C08F 10/02
[52] U.S. Cl. .................................. 526/130; 252/429 B; 252/431 R; 252/431 P; 526/114; 526/121; 526/129; 526/352
[58] Field of Search ............ 252/429 B, 431 R, 431 P; 526/129, 142, 114, 121, 130

[56] References Cited

U.S. PATENT DOCUMENTS

| | | | |
|---|---|---|---|
| 3,150,122 | 9/1964 | Andersen et al. | 526/142 |
| 3,161,628 | 12/1964 | Dost et al. | 526/142 |
| 3,324,095 | 6/1967 | Carrick et al. | 526/127 |
| 3,493,554 | 2/1970 | Rekers | 526/352 |
| 3,535,297 | 10/1970 | Carrick et al. | 526/129 |
| 3,642,749 | 2/1972 | Johnson et al. | 526/129 |

*Primary Examiner*—Edward J. Smith
*Attorney, Agent, or Firm*—James J. O'Connell

[57] ABSTRACT

An improved chromate ester catalyst useful for preparing, at relatively low temperatures, ethylene polymers which have a relatively lower molecular weight and which are more stable against oxidation is prepared by treating a silica supported chromate ester first with a phenol compound and then with a strong reducing agent.

31 Claims, No Drawings

PHENOL MODIFIED POLYMERIZATION CATALYST AND POLYMERIZATION PROCESS

BACKGROUND OF THE INVENTION

1. Field of the Invention

The invention relates to the catalytic polymerization of ethylene alone, or with other α-olefins, with silica supported chromate ester catalysts.

2. Description of the Prior Art

U.S. Pat. Nos. 3,324,095; 3,324,101; 3,642,749; 3,704,287; 3,752,795; 3,847,957 and Canadian Pat. No. 907,592 disclose the use of supported chromate ester compounds as catalysts for the polymerization of ethylene, alone, or with other α-olefins. These chromate ester compounds include silyl chromate esters, hindered ditertiary polyalicyclic chromate esters, and phosphorus, titanium and tin containing chromate ester compounds, as well as chromyl halides which can also be called oxyhalides of chromium. These chromate ester compounds may be used on activated inorganic oxide supports and the supported chromate ester compounds can, optionally, be treated with various organometallic reducing agents. These reducing agents include the dialkyl aluminum alkoxide type reducing agents which are disclosed in U.S. Pat. No. 3,324,095 and in Canadian Pat. No. 907,592. As disclosed in U.S. Pat. No. 3,324,095, the alkoxide, which may include a phenoxide compound, can be prepared in-situ, in a solution of the catalyst system. This may be accomplished by the addition of an alcohol or phenol and an aluminum alkyl to the supported silyl chromate ester.

Ethylene polymers made with these supported and reduced chromate ester catalysts tend to have a relatively high molecular weight. One of the means which is commonly employed for measuring the relative molecular weight of a polymeric material is a melt index procedure as disclosed in ASTM Procedure D-1238 (measured at 190° C., and reported as grams per 10 minutes). Polymers having a relatively high molecular weight have a relatively low melt index value. Thus, polymers with very high molecular weight values may have melt index values of 0, i.e., a no-flow melt index, to about 0.1 (under a 44 psi load on the ram of the melt index test device) or flow index values of about 1 to 20 (under a 440 psi load on the ram of the melt index test device). Higher melt index ranges of the order of about 0.5 to 1, with a corresponding flow index value of about 50 to 100 can be obtained with the conventional diethyl aluminum ethoxide treated chromate ester catalyst by increasing the polymerization temperature and/or the hydrogen concentration, i.e., the hydrogen to monomer ratio, in the reaction system at a given loading of chromium on the catalyst support.

The need for higher reaction temperatures leads to additional processing and energy consumption processes. Further, where the reaction is conducted in a fluid bed reactor, as disclosed in Canadian Pat. No. 971,700 and in U.S. Pat. Nos. 3,790,036; 3,790,550 and 3,876,602, the use of higher reaction temperatures can lead to the fusing of the resulting polymer into chunks which cannot be fluidized and which cannot be readily removed from the reactor. Further, the need for higher hydrogen concentrations in order to achieve these higher melt index values at a given level of total reactor pressure has disadvantage(s) in that it lowers catalyst productivity and leads to polymers of relatively small particle size which have poor fluidizing properties in a fluid bed reactor process.

The use of the diethyl aluminum phenoxide or pentaethyl dialuminum phenoxide [$(C_2H_5)_5Al_2(OC_6H_5)$] type reducing agents with the silyl chromate catalyst also tends to produce an ethylene polymer having a melt index range of about 0.3 to 10. However, these products have a very high cyclohexane extractables content which make them unacceptable for use in various applications.

Although ethylene polymers made with a silyl chromate catalyst which has been reduced with a diethyl aluminum ethoxide type reducing agent have a relatively low cyclohexane extractables content, their relatively high molecular weight ranges tend to preclude their use in various types of molding applications which require the use of polymers having higher melt index values of the order of about 0.2 to 1.0.

A further disadvantage of using the supported silyl chromate esters, to date, is the fact that it requires a relatively long time to accomplish the deposition of the chromate ester on the support.

British Pat. No. 1,109,944 indicates that phenol type compounds may be added to Ziegler type catalysts to provide ethylene polymerization catalysts which are more highly active as catalysts and produce better yields of polymer than catalyst systems made without the additive.

Prior to the present invention, however, it has not been possible to provide a chromate ester based catalyst which can be prepared in a relatively speedy manner and which would readily provide ethylene polymers having relatively high melt index values and relatively low cyclohexane extractable contents without the need for high concentrations of hydrogen as a chain transfer agent, and/or the use of high reaction temperatures during the polymerization reaction.

SUMMARY OF THE INVENTION

It has now been found that silica supported chromate ester catalysts can be speedily prepared for the purposes of producing ethylene polymers having relatively high melt index values and relatively low cyclohexane extractables contents without the need for a high polymerization temperature and/or a high ratio of hydrogen to monomer during the polymerization reaction if the catalyst is prepared with a phenol compound modifier in a specific manner, as disclosed below.

An object of the present invention is to provide improved silica supported chromate ester catalysts for the purposes of providing ethylene polymerization catalysts which will provide ethylene polymers having a relatively high melt index value and a relatively low cyclohexane extractables content without the need for employing large amounts of hydrogen as a chain transfer agent, and/or high reaction temperatures, during the polymerization reaction.

A further object of the present invention is to provide a means for providing ethylene polymers made with chromate ester catalysts which have improved oxidative stability properties.

A further object of the present invention is to provide an improved process for producing ethylene polymers having a relatively high melt index value, a relatively low cyclohexane extractables content, and which are also relatively oxidatively stable.

DESCRIPTION OF THE PREFERRED EMBODIMENT

Selected phenol compounds are used to modify silica supported chromate ester based ethylene polymerization catalysts for the purposes of speedily providing a supported chromate ester catalyst which can be used to provide ethylene polymers which have relatively high melt index values, relatively low cyclohexane extractables contents, and which are relatively oxidatively stable, without the need for high reaction temperatures, and/or a high hydrogen/monomer ratio, during the polymerization reaction.

THE CHROMATE ESTERS

The chromate ester compounds which may be used as the catalysts in the present invention have, in their structure, one or more groups of the formula $CrO_2Y_2$ wherein the Y's are the same or different and are halogen (Cl, Br, I or F), -O-R, O-Ti-(OR)$_3$,

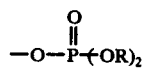

or O-M-(R)$_3$ radicals, wherein R is a $C_1$ to about $C_{20}$ hydrocarbyl and M is Si or Sn.

These chromate (CrVI) esters include chromyl halides such as chromyl chloride, silyl chromate ester compounds, hindered ditertiary polyalicyclic chromate esters and various phosphorus, titanium, tin and germanium containing chromate esters as described below.

The chromyl halides may also be called oxyhalides of chromium.

Chromyl chloride has the formula $CrO_2Cl_2$.

The silyl chromate compounds employed herein are characterized by having one or more groups of the formula:

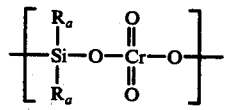

wherein $R_a$ can be any hydrocarbyl group having from 1 to about 14 carbon atoms. Among the preferred compounds containing said group are the bistrihydrocarbylsilylchromates of the formula:

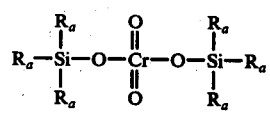

wherein $R_a$ is any hydrocarbyl group containing from 1 to about 14 carbon atoms, preferably from about 3 to about 10 carbon atoms. Illustrative thereof are methyl, ethyl, propyl, iso-propyl, iso-butyl, n-pentyl, isopentyl, hexyl, 2-methyl-pentyl, heptyl, octyl, 2-ethylhexyl, nonyl, decyl, dodecyl, tridecyl, tetradecyl, benzyl, phenethyl, p-methylbenzyl, phenyl, tolyl, xylyl, naphthyl, ethylphenyl, methylnaphthyl, dimethylnaphthyl, and the like. Examples of the preferred silyl chromate compounds are such compounds as:
  Bis-trimethylsilyl chromate
  Bis-triethylsilyl chromate
  Bis-tributylsilyl chromate
  Bis-triisopentylsilyl chromate
  Bis-tri-2-ethylhexylsilyl chromate
  Bis-tridecylsilyl chromate
  Bis-tri(tetradecyl)silyl chromate
  Bis-tribenzylsilyl chromate
  Bis-triphenethylsilyl chromate
  Bis-triphenylsilyl chromate
  Bis-tritolylsilyl chromate
  Bis-trixylylsilyl chromate
  Bis-trinaphthylsilyl chhromate
  Bis-triethylphenylsily chromate
  Bis-trimethylnaphthylsilyl chromate
  Polydiphenylsilyl chromate
  Polydiethylsilyl chromate and the like.

While both the aryl- and alkyl-substituted silyl chromates can be used, it is to be noted that the arylsilyl chromates are more stable. The alkylsilyl chromates, because of their instability and in some instances because they may be spontaneously explosive, should be handled with extreme caution and preferably in solution or in an inert atmosphere, or both.

The di-tertiary polyalicyclic chromate esters used in the practice of this invention are, generally, esters of tertiary bridged polyalicyclic alcohols and have the general formula:

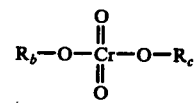

wherein $R_b$ and $R_c$ are similar or dissimilar hindered polyalicyclic groups which contain two or more saturated rings which are sterically hindered by the presence of bridged ring structures. The preparation of these ditertiary polyalicyclic chromate esters is disclosed in U.S. Pat. Nos. 3,642,749 and 3,704,287, which disclosures are incorporated herein by reference.

Other hydrocarbyl esters would include those of the formula

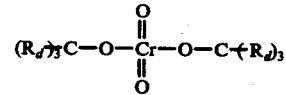

wherein $R_d$ is a hydrocarbon group containing 2 to about 6 carbon atoms. The $R_d$ group may be alkyl, aryl or arylalkyl such as phenyl and butyl. The preparation of these esters is disclosed in U.S. Pat. No. 3,493,554, which disclosure is incorporated herein by reference.

Other chromate esters which may be used in the present invention include various phosphorous, titanium, tin and germanium containing chromate esters. The phosphorous containing chromate ester compounds that may be employed herein are characterized by the formula:

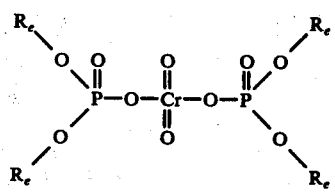

wherein the $R_e$'s may be the same or different and are $C_1$ to about $C_{10}$ hydrocarbon radicals. Among the preferred of such phosphorous containing chromate ester compounds are those in which $R_e$ is an aryl radical such as tolyl and phenyl. The preparation of these phosphorous containing chromate esters as olefin polymerization catalysts is disclosed in U.S. Pat. No. 3,474,080, which disclosure is incorporated herein by reference.

The titanium containing chromate ester compounds that may be employed herein are characterized by the formula:

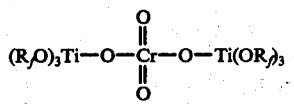

wherein $R_f$ is a hydrocarbon radical having 1 to about 14 carbon atoms, and including alkyl, alkaryl, aryl, and cycloalkyl radicals. Examples of such compounds, and their preparation, are disclosed in U.S. Pat. Nos. 3,752,795 and 3,847,957, the disclosures of which are incorporated herein by reference.

The tin containing chromate ester compounds that may be employed herein are characterized by the formula

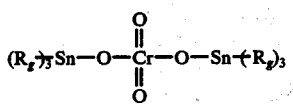

wherein the $R_g$'s are the same or different $C_1$ to $C_{14}$ hydrocarbyl groups, and which are the same as those for the $R_a$ groups of the silyl chromate esters described above. Examples of such tin containing compounds, and their preparation are disclosed in U.S. Pat. Nos. 3,876,554 and 3,884,832 the disclosures of which are incorporated herein by reference.

The chromate esters may be used individually or in combination with each other.

SUPPORT

The catalyst species, as noted above, comprises a chromate ester deposited on a silica containing support. About 0.001 to 10% or more weight of the chromate ester compound is used on the support based on the combined weight of the chromate ester compound and the support. The support is loaded as much as possible with the chromate ester. The amount of the chromate ester compound which can be used on the support varies depending on the particular support being used and the activation temperature of such support.

The materials which are to be used as a support for the chromate esters in accordance with the present invention are silica containing materials having a high surface area, that is, a surface area in the range of about 50 to about 1,000 square meters per gram. The supporting material is silica, alone, or with minor amounts by weight ($\leq 50\%$) of other inert support materials such as alumina, titania and zirconia.

Because the chromate esters are sensitive to moisture, the catalyst support should be completely dried before it is brought into contact with the chromate ester compound. This is normally done by simply heating or pre-drying the catalyst support with an inert gas prior to use. It has been found that the temperature of drying has an appreciable effect on the relative productivity of the catalyst system and on the molecular weight distribution and the melt index of the polymer produced.

Drying or activation of the support can be accomplished at nearly any temperature up to about its sintering temperature for a period of time which is at least sufficient to remove the adsorbed water from the support while at the same time avoiding such heating as will remove all of the chemically bound water from the support. The passage of a stream of dry inert gas through the support during the drying aids in the displacement of the water from the support. Drying temperatures of from about 200° C. to 1000° C. for a short period of about six hours or so should be sufficient if a well dried inert gas is used, and the temperature is not permitted to get so high as to completely remove the chemically bound hydroxyl groups on the surface of the support.

Any grade of silica containing support can be used but intermediate density (MSID) silica having a surface area of about 300 square meters per gram and a pore diameter of about 200 A, and an average particle size of about 70 microns and intermediate density (ID) silica having a surface area of about 300 square meters per gram, a pore diameter of about 160 A and an average particle size of about 100 microns are preferred. Other grades having a surface area of about 600 square meters per gram, a pore diameter of 50–70 A and an average particle size of about 60 microns are also quite satisfactory. Variations in melt index control and in polymer productivity can be expected between different grades of supports.

The chromate ester can be added to the support by a slurry technique where the selected and properly dried support is added under conditions which exclude the presence of air and moisture to a solution containing the chromate ester and solvent to form a slurry. The slurry may be stirred for a period of up to about 4 hours to obtain good adsorption of the chromate ester on the support. The supported chromate ester can then be treated sequentially, with the phenol compound and the reducing agent, in the slurry system, as described below. The solvent is then drained from the slurry and the catalyst used as such, as described below, or the retained solvent can be evaporated under conditions which exclude oxygen and moisture to yield a dry, powdery supported chromate ester. Where a dried, powdery, catalyst is desired, as for fluid bed reaction systems, the drying of the supported catalyst should be accomplished at a temperature of $\leq 60°$ C. The use of higher drying temperatures tends to have an adverse effect (a lowering) on the melt index of the resin made with the catalyst.

PHENOL COMPOUNDS

The phenol compounds used to treat or modify the catalyst compositions of the present invention contain a phenolic hydroxyl group and include those having one of the structures:

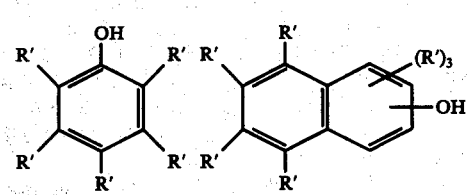

wherein the R's are the same or different and are H, $C_1$ to $C_{14}$ hyrocarbon, halogen, and any other inert radicals.

Inert radicals are those which do not interfere with the catalytic activity of the catalyst.

Those phenol compounds, therefore, would include phenol which is the most effective of such compounds found to date for the purposes of the present invention. Other effective compounds include p-bromophenol, p-cresol, p-tertiary butyl phenol and β-naphthol.

THE REDUCING AGENTS

The organometallic reducing agents which may be used to treat the supported chromate ester catalysts of the present invention include any strong reducing agent, i.e., a compound which will react vigorously with water under ambient conditions to yield hydrogen, or a hydrocarbon. They are also devoid of halogen atoms. These reducing agents must also be capable of acting as alkylating agents. A listing of such strong reducing agents is disclosed in U.S. Pat. No. 3,879,368 which disclosure is incorporated herein by reference. These strong reducing agents would thus include aluminum alkoxide compounds which have the structure $$R''_x Al(OR'')_w$$

in which $x$ and $w$ are each integers from 1 to 2, inclusive, and together total 3, and $R''$ is a hydrocarbyl group containing from 1 to about 14 carbon atoms such as alkyl, aralkyl, aryl, alkaryl, alicyclic, bicyclic, and similar hydrocarbons. Examples of such groups are methyl, ethyl, propyl, iso-propyl, n-butyl, iso-butyl, n-pentyl, iso-pentyl, t-pentyl, hexyl, cyclohexyl, 2-methylpentyl, heptyl, octyl, 2-ethylhexyl, cyclohexylmethyl, nonyl, decyl, undecyl, dodecyl, tridecyl, tetradecyl, benzyl, pinyl, pinylmethyl, phenethyl, p-methylbenzyl, phenyl, tolyl, xylyl, naphthyl, ethylphenyl, methylnaphthyl, dimethylnaphthyl, norbornyl, norbornyl methyl or any such similar hydrocarbyl groups. The aluminum monoalkoxides are the preferred reducing agents of this group of compounds. The $R''$ groups can be the same or different in these compounds.

Other strong reducing agents which may be used in th present invention would include aluminum alkyl compounds of the formula $$R'''_y AlH_z$$

wherein $R'''$ is an alkyl group as defined above, $y$ is an integer from 1 to 3 inclusive and $z$ is an integer from 0 to 2 inclusive, with the proviso that the sum of $y$ and $z$ is 3. Where these compounds contain more than one $R'''$ group, such groups may be the same or different.

COMPOSITE CATALYSTS

The composite catalysts of the present invention, as noted above, are prepared from the above described phenol compounds, reducing agents and silica supported chromate ester compounds.

The composite catalyst is made from, per 100 parts by weight of support, about 0.01 to 20 weight percent of the reducing agent, about 0.001 to 5 weight percent of the phenol compound and about 0.001 to 10 weight percent of the chromate ester. About 1 to 16 mols of the reducing agent are used per mol of the chromate ester. The reducing agent is used in such amounts as to provide chromium atoms in the composite catalyst in an average valence state of less than six.

About 0.1 to 2.0 moles of the phenol compound are used per mol of the chromate ester. The phenol compound and the reducing agent are used to treat the supported chromate ester by being brought into contact with the supported ester.

The chromate ester should be added to the support and treated with the phenol compound before the reducing agent is brought into contact with the chromate ester.

The phenol compound can be used after the chromate ester is deposited on the support or concurrent with the deposition of the chromate ester on the support. Where the phenol compound is added to the solution of the chromate ester with which the chromate ester is to be deposited on the support, the phenol compound catalyzes the adsorption of the chromate ester on the support and significantly accelerates the deposition process. Using the phenol compound in this way the chromate ester can be deposited on the support in less than about thirty minutes, and can be done in about five to 20 minutes. In fact, it has been found that if the process of depositing the chromate ester on the support is allowed to proceed in the presence of the phenol compound for more than about thirty minutes the ability of the resulting catalyst system to produce polymers of relatively high melt index in relatively large yields is severely curtailed.

The phenol compound must be used under anhydrous conditions, that is, in the substantial absence of water or other compounds which contain hydroxyl groups which are reactive enough as to complete with the hydroxyl groups of the phenol compound. It is believed in this regard, that, in the process of treating the supported chromate esters with the phenol compound, the phenol compound reacts with the chromium atom of the supported ester to form a phenoxy bond with the chromium atom.

Most of the supported chromate esters of the present invention have a yellow to orange color. Upon the addition of the phenol compound thereto the color usually changes to brown or olive green.

Where the chromate ester is treated with the phenol compound, it is preferably done in a solvent in which the phenol compound and the reducing agent are both soluble, and in which the chromate ester is slurried, as described above.

The phenol compound is used to treat the chromate ester at a temperature of about $-10°$ to $+60°$ C. and preferably of about $+20°$ to $+40°$ C.

The reduction of the supported and phenol treated chromate ester compounds with the organometallic reducing agent is conducted at temperatures of about $-10°$ to $+100°$ C. and preferably of about $+20°$ to $+50°$ C.

The reduction reaction is preferably conducted in solution in an organic solvent in which the reducing agent is soluble. The reduction reaction occurs rapidly, depending on the amount of catalyst being reduced and the temperature being employed in the reaction.

Suitable solvents which may be used in the reduction reaction include isopentane, n-hexane, n-heptane and toluene.

Care should be taken to avoid having moisture or air contact the composite catalyst after it is prepared. The reagents used in preparing the composite catalyst should also be free of moisture, air, or other catalyst poisons.

About 0.001 to 0.01 weight percent of the composite catalyst is used per mol of monomer being polymerized. The amount of catalyst being employed may vary depending on the type polymerization procedure being employed.

THE MONOMERS

The monomers which may be copolymerized with ethylene in accordance with the present invention may be one or more alpha-olefins contains 3 to about 12, inclusive, carbon atoms. The monomers may be mono-olefins or di-olefins.

The mono-olefins would include propylene, butene-1, pentene-1, 3-methylbutene-1, hexene-1, 4-methylpentene-1, 3-ethylbutene-1, heptene-1, octene-1, decene-1, 4,4-dimethylpentene-1, 4,4-diethylhexene-1, 3,4-dimethylhexene-1, 4-butyl-1-octene, 5-ethyl-1-decene, 3,3-dimethyl-butene-1 and the like. Among the diolefins which may be used are butadiene, 1,5-hexadiene, dicyclopentadiene, ethylidene norbornene, and the like.

THE POLYMERS

The solid polymers which are prepared in accordance with the teachings of the present invention include ethylene homo- and co- polymers which have densities of about 0.910 to 0.967, inclusive, and melt indices of about 0.01 to 10 grams per 10 minutes. Where the polymers have a density of $\geq 0.950$ they will have a cyclohexane extractables contents of about 0.5 to 6.0 weight percent. The polymers are also more oxidatively stable than polymers made without the use of the phenol compound to modify the catalyst as judged by the absorption of oxygen at temperatures of $\leq 110°$ C.

The copolymers contain a major amount, i.e., at least 90 by weight of ethylene, and a minor amount, i.e., up to 10 by weight of one or more of the mono- and/or diolefins which may be interpolymerized therewith.

THE POLYMERIZATION REACTION

After the composite catalysts have been formed, the polymerization reaction is conducted by contacting the monomer charge, and substantially in the absence of catalyst poisons, with a catalytic amount of the catalyst at a temperature and at a pressure sufficient to initiate the polymerization reaction. If desired, an inert organic solvent may be used as a diluent and to facilitate materials handling.

The polymerization reaction is carried out at temperatures of from about 30° C. or less up to about 200° C. or more, depending to a great extent on the operating pressure, the pressure of the entire monomer charge, the particular composite catalyst being used and its concentration. Preferably, the temperature is from about 30° C. to about 100° C. in the conventional slurry or "particle forming" technique and from 100° C. to 200° C. in "solution forming".

The pressure can be any pressure sufficient to initiate the polymerization of the monomer to the desired polymer and can be carried out from subatmospheric pressure, using an inert gas as a diluent, to superatmospheric pressure of up to about 1,000,000 psig (pounds per square inch gauge), or more, but the preferred pressure is from atmospheric up to about 100 psig. As a general rule, a pressure of 20 to 800 psig is preferred.

When an inert organic solvent medium is employed in the polymerization process of this invention it should be one which is inert to all the other components and products of the reaction system and be stable at the reaction conditions being used. It is not necessary, however, that the inert organic solvent medium also serve as a solvent for the polymer produced. The inert organic solvents which may be used include saturated aliphatic hydrocarbons, such as hexane, heptane, pentane, isooctane, purified kerosene and the like, saturated cycloaliphatic hydrocarbons, such as cyclohexane, cyclopentane, dimethylcyclopentane and methylcyclohexane and the like, aromatic hydrocarbons such as benzene, toluene, xylene, and the like and chlorinated hydrocarbons, such as chlorobenzene, tetrachloroethylene, ortho-di-chlorobenzene, and the like. Particularly preferred solvent media are cyclohexane, pentane, hexane and heptane.

When the solvent serves as the principal reaction medium, it is of course, desirable to maintain the solvent medium substantially anhydrous and free of any possible catalyst poisons such as moisture and oxygen, by redistilling or otherwise purifying the solvent before use in this process. Treatment with an absorbent material such as high surface area silicas, aluminas, molecular sieves and like materials are beneficial in removing trace amounts of contaminants that may reduce the polymerization rate or poison the catalyst during the polymerization reaction.

Conventional procedures may be employed in recovering the polymer from any solvent media in which it may be produced.

By conducting the polymerization reaction in the presence of hydrogen, which functions as a chain transfer agent, the molecular weight of the polymer may be furthr controlled.

Hydrogen may be used in the polymerization reaction in amounts varying between about 0.001 to about 10 moles of hydrogen per mole of olefin monomer.

The polymerization of alpha olefins such as ethylene with the catalysts of this invention can also be conducted in a fluid bed process such as that disclosed in United Kingdom Pat. Nos. 1,248,952 and 1,248,953, the disclosures of which are also incorporated herein by reference.

The following Examples are designed to merely illustrate the present invention and are not intended as a limitation upon the scope thereof.

The properties of the polymers produced in the Examples were determined by the following test methods:

| | | |
|---|---|---|
| Density | ASTM D-1505 | Plaque is conditioned for one hour at 120° C. to approach equilibrium crystallinity. |
| Melt Index (MI) | ASTM D-1238 | Measured at 190° C. reported as grams per 10 minutes. |
| Flow Index (HLMI) | ASTM D-1238 | Measured at 10 times the weight used in the melt index test above. |
| Cyclohexane Extractables | | Extraction in boiling cyclohexane for $\geq 10$ hours. |
| Yield of Polymer | | Measured as grams of polymer per hour of polymerization time per gram of composite catalyst employed. $(gh^{-1} g^{-1})$ |

EXAMPLES 1 to 17

A. Catalyst Preparation

A series of seventeen catalysts were prepared with and without various phenol compounds to demonstrate the utility of such compounds in accordance with the teachings of the present invention. For comparative purposes, the catalyst of Example 1 was made without any phenol compound, and the catalysts of Examples 16 and 17 were made with p-hydroquinone in lieu of a phenol compound of the present invention.

The support used for each catalyst was intermediate grade silica which had a surface area of 300 square meters per gram and an average pore diameter of 200 A. The support had previously been activated by being heated under nitrogen for $\geq$ 18 hours at 600° C.

The chromate ester compound used for each catalyst was bis(triphenyl silyl) chromate.

The chromate ester (20 mg or 32 × $10^{-3}$ millimoles) was deposited on 1.0 gram of the support in 30–35 ml of n-hexane at room temperature. Where the phenol compound of the present invention, or the p-hydroquinone was used, it was added 1 hour after the chromate ester was deposited on the support and allowed to react for about 10 minutes. After this 10 minute period the reducing agent was added.

After the phenol compound reacted with the supported chromate ester the supported catalyst turned dark brown in color, from its original yellow-orange color.

To each of the resulting slurried catalyst systems there was then added 168 ± 3 × $10^{-3}$ millimoles of diethyl aluminum ethoxide, as a reducing agent, at a temperature of about 25° C. The reduction reaction was allowed to proceed for at least 10 minutes.

The resulting slurried catalyst systems were then added, as is, to the polymerization reactions, without attempting to separate the composite catalyst from the solvent.

The amounts and types of the phenol compounds, and the amounts of reducing agent, used in preparing each of the catalyst systems of Examples 1 to 17 are listed below in Table I.

B. Polymerization Reactions

Each of the seventeen catalyst systems prepared as described above were used to homopolymerize ethylene at 80° C. in 500 ml of n-hexane as a solvent under a pressure of 15 psi of $H_2$ and an ethylene pressure of 185 psi. Each reaction was conducted for 40–100 minutes. The yields and properties of the resulting polymers are also listed below in Table I. A review of such data indicates that when the phenol compounds of the present invention are used, as in Examples 2–15, the melt index and flow index values of the resulting resins are significantly increased without causing a significant change in the cyclohexane extractables contents of such resins. In some cases, notably with the use of phenol, there is also a significant increase in the yield of the resin.

TABLE I

| Exp. No. | Yield of Polymer $gh^{-1}g^{-1}$ | Melt Index gr/10 min. | Flow Index gr/10 min. | Melt Flow Ratio | % Cyclohexane Extractables | Components of Catalyst (mmoles × $10^3$) | | |
|---|---|---|---|---|---|---|---|---|
| | | | | | | Reducing Agent | Phenol | Silyl Chromate Ester |
| 1 | 250 | 0.43 | 28.9 | 68 | 4.0 | 168 | 0 | 32 |
| 2 | 385 | 0.71 | 45.6 | 64 | 3.9 | 168 | 18.4 | 32 |
| | | | | | | | p-bromophenol | |
| 3 | 247 | 0.65 | 42.4 | 65 | 4.1 | 170 | 17 | 32 |
| 4 | 331 | 0.56 | 35.8 | 64 | 4.0 | 168 | 23 | 32 |
| 5 | 230 | 0.75 | 46.5 | 62 | 2.9 | 168 | 32 | 32 |
| 6 | 264 | 1.00 | 56.7 | 5.0 | 168 | 47 | 32 | |
| | | | | | | | p-cresol | |
| 7 | 215 | 0.57 | 35.4 | 62 | 4.2 | 168 | 23 | 32 |
| 8 | 87 | 0.56 | 28.4 | 51 | 4.3 | 168 | 32 | 32 |
| 9 | 200 | 0.59 | 36.0 | 62 | 4.8 | 168 | 39 | 32 |
| | | | | | | | p-Bu t phenol | |
| 10 | 220 | 0.61 | 37.0 | 61 | 4.4 | 168 | 24 | 32 |
| 11 | 255 | 0.65 | 40.9 | 65 | 4.2 | 168 | 33 | 32 |
| 12 | 155 | 0.58 | 38.4 | 65 | 4.1 | 168 | 42 | 32 |
| | | | | | | | β-naphthol | |
| 13 | 195 | 0.52 | 36.2 | 70 | 4.1 | 168 | 16 | 32 |
| 14 | 152 | 0.59 | 40.0 | 68 | 4.8 | 168 | 24 | 32 |
| 15 | 119 | 0.56 | 38.4 | 68 | — | 168 | 32 | 32 |
| | | | | | | | p-hydroquinone | |
| 16 | 165 | 0.42 | 28.8 | 69 | 4.2 | 165 | 12 | 32 |
| 17 | 87 | 0.47 | 35.5 | 76 | 4.0 | 167 | 23 | 32 |

EXAMPLES 18 to 21

A. Catalyst Preparation

A series of four catalysts were prepared as described above with respect to Examples 1 to 17, using the same support, chromium ester and reducing agent. Phenol was used as the phenol compound in making each catalyst.

These catalysts were made and evaluated to demonstrate the effect which the reaction time for the phenol compound has on the melt index values of the resins made with such catalysts.

Each catalyst was made with 1.0 gram of the support, 20 mg (32 × $10^{-3}$ millimoles) of the chromate ester, 21 × $10^{-3}$ millimoles of phenol and 160 × $10^{-3}$ millimoles of the reducing agent.

After the chromate ester was deposited on the support the phenol was added to the resulting slurry and allowed to react with the supported ester for various periods of time, i.e., 2.5, 6, 21 and 30 minutes before adding the reducing agent to the system. The effect of such variation in the phenol reaction time on the melt index values of the resulting resins is shown below in Table II. The resulting slurried catalyst systems were added as is to their respective polymerization vessels.

B. Polymerization Reactions

Each of the four catalyst systems prepared as described above were used to homopolymerize ethylene as described above with respect to Examples 1 to 17. The yields and properties of the resulting polymers are also listed below in Table II. A review of such data indicates that, in comparison to the results obtained with the catalyst of Example 1, the melt index and flow index values of the resulting resins increases, in general, as the reaction time of the phenol compound is increased, with peak melt index and flow index values being obtained with catalysts made with a phenol compound reaction time in the range of about 5 to 20 minutes.

EXAMPLES 24 to 31

A. Catalyst Preparation

TABLE II

| Example | Yield of Polymer $gh^{-1}g^{-1}$ | Melt Index, gr/10 min. | Flow Index, gr/10 min. | Melt Flow Ratio | % Cyclohexane Extractables | Phenol Compound Reaction Time |
|---|---|---|---|---|---|---|
| 18 | 197 | 0.45 | 36.4 | 81 | 4.6 | 2.5 |
| 19 | 205 | 0.66 | 37.1 | 56 | 4.2 | 6 |
| 20 | 280 | 0.65 | 37.6 | 58 | 4.0 | 21 |
| 21 | 120 | 0.57 | 36.0 | 63 | 4.0 | 30 |

EXAMPLES 22 to 23

A. Catalysts Preparation

A series of four catalysts were evaluated to demonstrate the undesirability of heating the composite catalyst systems for a prolonged period of time. One of the catalyst systems used was that of Example 1, and the other three were prepared as was that of Example 19. The catalyst of Example 1 was made, as noted above, without a phenol compound and thus had no phenol compound reaction time (as described above). The other three catalysts, those of Examples 19, 22 and 23 herein, were each made with phenol and had a phenol compound reaction time of six minutes (as in Example 19 above).

After the formation of the catalysts, they were added, as slurry systems, to their respective polymerization reaction systems. The catalyst systems of Examples 22 and 23, however, were then heat aged at 80° C. for 10 or 30 minutes in the solvent under 15 psi of nitrogen. The amounts of the components of these catalyst systems, and their heat aging times are listed below in Table III.

B. Polymerization Reactions

Each of the four catalyst systems prepared as described above were then used to homopolymerize ethylene as described above with respect to Examples 1 to 17. The yields and properties of the resulting polymers are also listed below in Table III. A review of such data indicates that, when the composite catalyst system is heated for a prolonged period of time its ability to provide polymers of relatively high melt index and in high yields is diminished.

A series of eight catalysts were prepared to demonstrate the utility of the catalysts of the present invention for the purposes of making ethylene-propylene copolymers.

Each of the catalysts were prepared as was the catalyst of Example 19 except for the use of varying amounts, from 0 to 46.3 × $10^{-3}$ millimoles, of phenol therein as the phenol compound. When the phenol was used, i.e., in Examples 25-31, the phenol compound reaction time in each case was six minutes. Each catalyst was thus made with 32 × $10^{-3}$ millimoles of the chromate ester and 160 × $10^{-3}$ millimoles of diethyl aluminum ethoxide reducing agent. The amount of the phenol used for each catalyst is listed below in Table IV.

After the addition of the reducing agent to the slurried catalyst system, and the reaction of the reducing agent with the chromate ester, the resulting slurried composite catalyst systems were added, as is, to their respective polymerization reaction vessels without attempting to separate the composite catalyst from the solvent.

B. Polymerization Reactions

Each of the eight catalysts prepared as described above was then used to copolymerize ethylene and propylene at 80° C. in 500 ml of n-hexane, under a pressure of 10 psi of propylene and 190 psi of ethylene. Each polymerization reactions was conducted for 40-100 minutes. The yields and properties of the resulting polymers are also listed below in Table IV. A review of such data indicates that the melt index values of the copolymers can be significantly raised, with phenol to chro-

TABLE III

| Example | Yield of Polymer $gh^{-1}g^{-1}$ | Melt Index gr/10 min. | Flow Index gr/10 min. | Melt Flow Ratio | % Cyclohexane Extractables | Components of Catalyst (mmoles × $10^3$) | | | Heat Aging Time (minutes) |
|---|---|---|---|---|---|---|---|---|---|
| | | | | | | Reducing Agent | Phenol | Chromate Ester | |
| 1 | 250 | 0.43 | 28.9 | 68 | 4.0 | 168 | 0 | 32 | 0 |
| 19 | 205 | 0.66 | 37.1 | 56 | 4.2 | 160 | 21 | 32 | 0 |
| 22 | 201 | 0.66 | 40.3 | 61 | 4.1 | 160 | 21 | 32 | 10 |
| 23 | 140 | 0.52 | 34.7 | 67 | 3.8 | 160 | 21 | 32 | 30 | mate ester mol ratios of about > 0.5 to at least about 1.5 (Examples 28-31) without significantly changing the cyclohexane extractables content of such polymers.

TABLE IV

| Example | Yield of Polymer $gh^{-1}g^{-1}$ | Melt Index gr/10 min. | Flow Index gr/10 min. | Melt Flow Ratio | % Cyclohexane Extractables | Density gm/cm³ | Amount of Phenol Used (mmoles × $10^3$) |
|---|---|---|---|---|---|---|---|
| 24 | 540 | 2.3 | 140 | 60 | 7.8 | 0.9520 | 0.0 |
| 25 | 462 | 1.6 | 102 | 63 | 5.4 | 0.9545 | 8.0 |
| 26 | 584 | 1.8 | 110 | 61 | 5.9 | 0.9545 | 9.2 |
| 27 | 487 | 2.0 | 130 | 64 | 5.9 | 0.9546 | 16.8 |
| 28 | 508 | 4.7 | — | — | 7.0 | 0.9543 | 24.2 |
| 29 | 487 | 4.1 | — | — | 6.5 | 0.9544 | 36.0 |

TABLE IV-continued

| Example | Yield of Polymer gh$^{-1}$g$^{-1}$ | Melt Index gr/10 min. | Flow Index gr/10 min. | Melt Flow Ratio | % Cyclohexane Extractables | Density gm/cm$^3$ | Amount of Phenol Used (mmoles × 10$^3$) |
| --- | --- | --- | --- | --- | --- | --- | --- |
| 30 | 542 | 3.0 | — | — | 6.1 | 0.9562 | 45.2 |
| 31 | 376 | 8.4 | — | — | 8.7 | 0.9538 | 46.3 |

EXAMPLES 32 to 36

A. Catalyst Preparation

A series of five catalysts were prepared to demonstrate the utility of adamantyl chromate ester in the catalyst systems of the present invention.

Each of the catalysts were prepared as were the catalysts of Examples 1-17, using 1.0 gram of the support, 32 × 10$^{-3}$ millimoles of the adamantyl chromate, 0 to 46 × 10$^{-3}$ millimoles of phenol as the phenol compound and 320 × 10$^{-3}$ millimoles of diethyl aluminum ethoxide as the reducing agent. When the phenol compound was used, i.e., in Examples 34 to 36, the phenol compound reaction time was about 10 minutes. The amounts of the reactants used to prepare each catalyst are listed below in Table V.

After the addition of the reducing agent to the slurried catalyst systems, and the reaction of the reducing agent with the chromate ester, the resulting slurried composite catalyst systems were added, as is, to their respective polymerization reaction vessels without attempting to separate the composite catalyst from the solvent.

B. Polymerization Reactions

Each of the five catalysts prepared as disclosed above was then used to homopolymerize ethylene at 80° C. in 500 ml of n-hexane, under a pressure of 15 psi of hydrogen and 185 psi of ethylene. Each polymerization reaction was conducted for 40-100 minutes. The yields and properties of the resulting polymers are also listed below in Table V. A review of such data indicates that the melt index values of the polymers made with the adamantyl chromate ester catalysts can be significantly raised without significantly changing the cyclohexane extractables contents of the such polymers by treating the catalyst with a phenol compound.

EXAMPLES 37 TO 38

A. Catalyst Preparation

A series of two catalysts were prepared to demonstrate the utility of chromyl chloride as a chromate ester in the catalyst systems of the present invention.

Each of the catalysts were prepared as were the catalysts of Examples 1-17, using 1.0 gram of the support, 32 × 10$^{-3}$ millimoles of the chromyl chloride, 0 or 37 × 10$^{-3}$ millimoles of phenol as the phenol compound and 350 × 10$^{-3}$ millimoles of diethyl aluminum ethoxide as the reducing agent. When the phenol compound was used, i.e., in Example 37, the phenol compound reaction time was about 10 minutes. The amounts of the reactants used to prepare each catalyst are listed below in Table VI.

After the addition of the reducing agent to the slurried catalyst systems, and the reaction of the reducing agent with the chromate ester, the resulting slurried composite catalyst systems were added, as is, to their respective polymerization reaction vessels without attempting to separate the composite catalyst from the solvent.

B. Polymerization Reactions

Each of the two catalysts prepared as disclosed above was then used to homopolymerize ethylene at 75° C. in 500 ml of n-hexane, under a pressure of 30 psi of hydrogen and 170 psi of ethylene. Each polymerization reaction was conducted for 40-100 minutes. The yields and properties of the resulting polymers are also listed below in Table VI. A review of such data indicates that the melt index values of the polymers made with chromyl chloride catalysts can be significantly raised without significantly changing the cyclohexane extractables contents of the such polymers by treating the catalyst with a phenol compound.

TABLE V

| Example | Yield of Polymer gh$^{-1}$g$^{-1}$ | Melt Index, gr/10 min. | Flow Index, gr/10 min. | Melt Flow Ratio | % Cyclohexane Extractables | Amount of Phenol Used (mmoles × 10$^3$) |
| --- | --- | --- | --- | --- | --- | --- |
| 32 | 159 | 0.21 | 15.1 | 71 | 3.5 | 0 |
| 33 | 116 | 0.22 | 15.5 | 71 | — | 0 |
| 34 | 70 | 0.37 | 27.0 | 70 | — | 23 |
| 35 | 84 | 0.32 | 23.2 | 72 | — | 31 |
| 36 | 70 | 0.32 | 24.3 | 77 | 3.9 | 46 |

TABLE VI

| Example | Yield of Polymer gh$^{-1}$g$^{-1}$ | Melt Index gr/10 min. | Flow Index gr/10 min. | Melt Flow Ratio | % Cyclohexane Extractables | Amount of Phenol Used (mmoles × 10$^3$) |
| --- | --- | --- | --- | --- | --- | --- |
| 37 | 20 | 0.20 | 21.5 | 110 | 6.3 | 0 |
| 38 | 38 | 0.37 | 32.1 | 86 | 6.2 | 37 |

EXAMPLES 39 TO 42

A. Catalyst Preparation

A series of four catalysts were prepared to demonstrate the utility of triethyl aluminum as a reducing agent in the catalyst systems of the present invention.

Each of the catalysts were prepared as were the catalysts of Examples 1-17, using 1.0 gram of the support, $32 \times 10^{-3}$ millimoles of the silyl chromate ester, 0 to $72 \times 10^{-3}$ millimoles of phenol as the phenol compound and 96 or $112 \times 10^{-3}$ millimoles of the triethyl aluminum reducing agent. When the phenol compound was used i.e., in Examples 40 to 42, the phenol compound reaction time was about 10 minutes. The amounts of the reactants used to prepare each catalyst are listed below in Table VII.

After the addition of the reducing agent to the slurried catalyst systems, and the reaction of the reducing agent with the chromate ester, the resulting slurried composite catalyst systems were added, as is, to their respective polymerization reaction vessels without attempting to separate the composite catalyst from the n-hexane solvent.

B. Polymerization Reaction

Each of the four catalysts prepared as disclosed above was then used to homopolymerize ethylene at 80° C. in 500 ml of n-hexane under a pressure of 15 psi of hydrogen and 185 psi of ethylene. Each polymerization reaction was conducted for 40-100 minutes. The yields and properties of the resulting polymers are also listed below in Table VII. A review of such data indicates that the melt index values of the polymers made with the catalyst systems of the present invention, i.e., those of Examples 40 to 42, can be significantly raised without significantly changing the cyclohexane extractables contents of such polymers.

TABLE VII

| Example | Yield of Polymer gh$^{-1}$g$^{-1}$ | Melt Index, gr/10 min. | Flow Index, gr/10 min. | Melt Flow Ratio | % Cyclohexane Extractables | Components of Catalyst (mmoles × 10$^3$) | |
|---|---|---|---|---|---|---|---|
| | | | | | | Reducing Agent | Phenol |
| 39 | 160 | 0.07 | 10.3 | 156 | 6.8 | 112 | 0 |
| 40 | 186 | 0.24 | 29.2 | 124 | 6.5 | 96 | 24 |
| 41 | 316 | 1.00 | 87.4 | 87 | 7.4 | 96 | 48 |
| 42 | 457 | 1.74 | 127.3 | 73 | — | 96 | 72 |

What is claimed is:

1. In a process for polymerizing a monomer charge comprising at least a major amount of ethylene by contacting said charge with a catalyst comprising chromate ester deposited on a support comprising silica and treated with strong reducing agent, the improvement which comprises treating said catalyst, prior to said treatment with said reducing agent, with phenol compound, said chromate ester containing one or more groups of the formula $$CrO_2Y_2$$

wherein the Y's are the same or different and are radicals selected from the group consisting of halogen, —O—R—, —O—Ti—(OR)$_3$,

and —O—M—(R)$_3$, and wherein R is a C$_1$ to C$_{14}$ hydrocarbyl group and M is selected from the group consisting of Si and Sn.

2. A process as in claim 1 in which said phenol compound has one of the structures

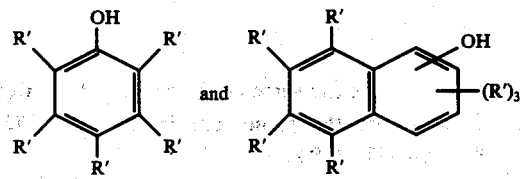

wherein the R's are the same or different and are selected from the group consisting of H, C$_1$ to C$_{14}$ hydrocarbyl and halogen.

3. A process as in claim 2 in which said chromate ester comprises chromyl chloride.

4. A process as in claim 3 in which said phenol compound is selected from the group consisting of phenol, p-bromophenol, p-cresol, p-tertiary butyl phenol, and β-naphthol.

5. A process as in claim 3 in which said phenol compound comprises phenol.

6. A process as in claim 2 in which said chromate ester comprises silyl chromate ester.

7. A process as in claim 6 in which said chromate ester comprises bis(triphenyl silyl) chromate ester.

8. A process as in claim 7 in which said phenol compound is selected from the group consisting of phenol, p-bromophenol, p-cresol, p-tertiary butyl phenol and β-naphthol.

9. A process as in claim 6 in which said phenol compound comprises phenol.

10. A process as in claim 6 in which said phenol compound comprises p-bromophenol.

11. A process as in claim 6 in which said phenol compound comprises p-cresol.

12. A process as in claim 6 in which said phenol compound comprises p-tertiary butyl phenol.

13. A process as in claim 6 in which said phenol compound comprises β-naphthol.

14. A process as in claim 1 in which said monomer charge consists of ethylene.

15. A process as in claim 1 in which said monomer charge comprises ethylene and at least one other alpha olefin.

16. A process as in claim 15 in which said monomer charge comprises ethylene and propylene.

17. A process as in claim 1 in which said catalyst is prepared from, in parts by weight, per 100 parts by weight of said support, of 0.001 to 10 parts of said chromate ester, 0.001 to 5 parts of said phenol compound, and 0.01 to 20 parts of said reducing agent.

18. An ethylene polymerization catalyst which comprises chromate ester deposited on a support comprising silica and sequentially treated with phenol compound and strong reducing agent, said chromate ester containing one or more groups of the formula $$CrO_2Y_2$$

wherein the Y's are the same or different and are radicals selected from the group consisting of halogen, —O—R, —O—Ti—(OR)$_3$,

and —O—M—(R)$_3$, and wherein R is a C$_1$ to C$_{14}$ hydrocarbyl grop and M is selected from the group consisting of Si and Sn.

19. A catalyst as in claim 18 in which said phenol compound has one of the structures

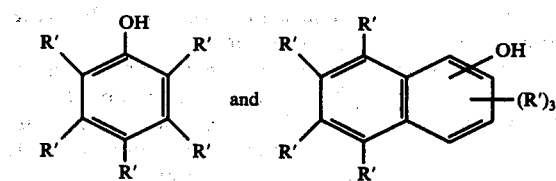

wherein the R's are the same or different and are selected from the group consisting of H, C$_1$ to C$_{14}$ hydrocarbyl and halogen.

20. A catalyst as in claim 19 in which said chromate ester comprises chromyl chloride.

21. A catalyst as in claim 20 in which said phenol compound is selected from the group consisting of phenol, p-bromophenol, p-cresol, p-tertiary butyl phenol and β-naphthol.

22. A catalyst as in claim 20 in which said phenol compound comprises phenol.

23. A catalyst as in claim 19 in which said chromate ester comprises silyl chromate ester.

24. A catalyst as in claim 23 in which said chromate ester comprises bis(triphenyl silyl)chromate.

25. A catalyst as in claim 24 in which said phenol compound is selected from the group consisting of phenol, p-bromophenol, p-cresol, p-tertiary butyl phenol and β-naphthol.

26. A catalyst as in claim 23 in which said phenol compound comprises phenol.

27. A catalyst as in claim 23 in which said phenol compound comprises p-bromophenol.

28. A catalyst as in claim 23 in which said phenol compound comprises p-cresol.

29. A catalyst as in claim 23 in which said phenol compound comprises p-tertiary butyl phenol.

30. A catalyst as in claim 23 in which said phenol compound comprises β-naphthol.

31. A catalyst as in claim 18 which is prepared from, in parts by weight, per 100 parts by weight of said support, of 0.001 to 10 parts by weight of said chromate ester, 0.001 to 5 parts by weight of said phenol compound, and 0.01 to 20 parts by weight of said reducing agent.

* * * * *

UNITED STATES PATENT OFFICE
CERTIFICATE OF CORRECTION

Patent No. 4,065,612     Dated December 27, 1977

Inventor(s) A. D. Hamer and F. J. Karol

It is certified that error appears in the above-identified patent and that said Letters Patent are hereby corrected as shown below:

Column 7, line 41, "th" should read --the--.

Column 8, line 29, "complete" should read -- compete--.

Column 9, line 7, "contains" should read --containing--.

Columns 11 and 12, in Table I, all the numerical results reported for Example 6 should read as follows, from left to right, --264, 1.00, 56.7, 57, 5.0, 168, 47, 32--.

Signed and Sealed this

Thirteenth Day of June 1978

[SEAL]

Attest:

RUTH C. MASON
*Attesting Officer*

DONALD W. BANNER
*Commissioner of Patents and Trademarks*